United States Patent
Ragucci

(10) Patent No.: US 12,392,943 B2
(45) Date of Patent: Aug. 19, 2025

(54) METHOD AND SYSTEM FOR FABRICATION AND USE OF A SPECTRAL BASIS FILTER

(71) Applicant: DRS Network & Imaging Systems, LLC, Melbourne, FL (US)

(72) Inventor: Anthony J. Ragucci, Dallas, TX (US)

(73) Assignee: DRS Network & Imaging Systems, LLC, Melbourne, FL (US)

(*) Notice: Subject to any disclaimer, the term of this patent is extended or adjusted under 35 U.S.C. 154(b) by 822 days.

(21) Appl. No.: 17/454,201

(22) Filed: Nov. 9, 2021

(65) Prior Publication Data

US 2022/0404531 A1 Dec. 22, 2022

Related U.S. Application Data

(60) Provisional application No. 63/211,672, filed on Jun. 17, 2021.

(51) Int. Cl.
| | |
|---|---|
| G02B 5/20 | (2006.01) |
| B29D 11/00 | (2006.01) |
| G02B 5/28 | (2006.01) |
| G02B 26/00 | (2006.01) |
| G06T 11/00 | (2006.01) |

(52) U.S. Cl.
CPC ........ *G02B 5/201* (2013.01); *B29D 11/00634* (2013.01); *G02B 26/008* (2013.01); *G06T 11/001* (2013.01); *G02B 5/289* (2013.01)

(58) Field of Classification Search
CPC ...... G02B 5/201; G02B 26/008; G02B 5/289; B29D 11/00634; G06T 11/001
See application file for complete search history.

(56) References Cited

U.S. PATENT DOCUMENTS

| | | | |
|---|---|---|---|
| 2008/0024410 A1 | 1/2008 | Ben-david et al. | |
| 2010/0056928 A1* | 3/2010 | Zuzak ................... | G01J 3/2823 356/302 |

(Continued)

FOREIGN PATENT DOCUMENTS

| | | |
|---|---|---|
| BR | 102013020692 A2 | 3/2016 |
| CN | 105938278 B | 1/2020 |

(Continued)

OTHER PUBLICATIONS

D Foresti et al—Hyperspectral imaging of photoluminescence in modern pigments and paintings—2018—politesi-polimi-it (Year: 2018).*

(Continued)

*Primary Examiner* — YuJang Tswei
(74) *Attorney, Agent, or Firm* — Kilpatrick Townsend & Stockton LLP

(57) ABSTRACT

An optical system includes a focal plane array having a plurality of pixels defined by a first number of pixels arrayed in a first direction and a second number of pixels arrayed in a second direction. The optical system also includes an optical filter optically coupled to the focal plane array. The optical filter has a plurality of super-pixels. Each of the plurality of super-pixels includes a predetermined number of sub-pixels and each of the predetermined number of sub-pixels is characterized by one of a plurality of oscillatory transmission profiles as a function of wavelength.

20 Claims, 11 Drawing Sheets

(56) References Cited

U.S. PATENT DOCUMENTS

| | | | |
|---|---|---|---|
| 2013/0063334 A1* | 3/2013 | Gibson | G02F 1/1347 345/107 |
| 2014/0034603 A1 | 2/2014 | Wehner | |
| 2014/0063298 A1 | 3/2014 | Buehler et al. | |
| 2014/0092258 A1* | 4/2014 | Dart | H04N 1/2137 382/303 |
| 2014/0293266 A1* | 10/2014 | Hsu | G01S 17/66 356/5.01 |
| 2015/0208144 A1* | 7/2015 | Holmes | H04J 14/0212 398/48 |
| 2015/0349006 A1* | 12/2015 | Wehner | G02B 27/286 250/208.1 |
| 2016/0156855 A1* | 6/2016 | Boulanger | H04N 23/20 348/164 |
| 2020/0241262 A1 | 7/2020 | Bodkin et al. | |
| 2022/0205843 A1* | 6/2022 | Kim | H04N 25/46 |

FOREIGN PATENT DOCUMENTS

| | | |
|---|---|---|
| CN | 111973195 A | 11/2020 |
| WO | 2020149056 A1 | 7/2020 |

OTHER PUBLICATIONS

Mouzali et al—Optical-based spectral modeling of infrared focal plane arrays—Jun. 24, 2016—Elsevier (Year: 2016).*

Rogers et al—Optical super-oscillations-sub-wavelength light focusing and super-resolution imaging—2013—IOP Publishing (Year: 2013).*

Yun et al—Plasmonic cavity-apertures as dynamic pixels for the simultaneous control of colour and intensity—Oct. 29, 2014—Nature Communications (Year: 2014).*

Zhong et al—Motion Magnification in Solar Imaging Data Sequences in the Sub-pixel Regime—Sep. 2021—Springer (Year: 2021).*

Flinkman et al., "Transmission Filters Forming Orthogonal Basis for Spectral Imaging Purposes", Optics Letters, vol. 45, No. 12, Jun. 15, 2020, pp. 3260-3263.

Application No. PCT/US2022/032546, International Search Report and Written Opinion, Mailed On Jan. 4, 2023, 10 pages.

PCT/US2022/032546, "Invitation to Pay Additional Fees and, Where Applicable, Protest Fee", Oct. 13, 2022, 2 pages.

Application No. EP22825548.5, Extended European Search Report, Mailed On Apr. 3, 2025, 13 pages.

* cited by examiner

| Name | $\lambda_s$ (μm) | $\lambda_L$ (μm) | $\lambda_s$ (μm) | $\lambda_l$ (μm) | $a_0$ | $a_1$ | $a_2$ | $a_3$ | $a_4$ | $b_1$ | $b_2$ | $b_3$ | $b_4$ |
|---|---|---|---|---|---|---|---|---|---|---|---|---|---|
| 9.25μm Long Pass | 8.0 | 10.5 | 9.25 | 10.50 | 1.040 | 0.591 | -0.029 | -0.089 | 0.002 | -0.234 | 0.027 | 0.189 | -0.040 |
| 10μm Notch | 8.0 | 10.5 | 9.80 | 10.20 | 0.320 | 0.307 | 0.269 | 0.212 | 0.144 | 0.000 | 0.000 | 0.000 | 0.000 |
| 9.00μm - 9.80μm | 8.0 | 10.5 | 9.00 | 9.80 | 0.640 | 0.034 | -0.286 | -0.005 | -0.119 | -0.536 | -0.036 | 0.026 | -0.030 |
| 9.05μm - 9.85μm | 8.0 | 10.5 | 9.05 | 9.85 | 0.640 | 0.101 | -0.268 | -0.014 | -0.089 | -0.528 | -0.106 | 0.022 | -0.084 |
| 9.10μm - 9.90μm | 8.0 | 10.5 | 9.10 | 9.90 | 0.640 | 0.166 | -0.233 | -0.022 | -0.038 | -0.511 | -0.169 | 0.016 | -0.117 |
| 9.15μm - 9.95μm | 8.0 | 10.5 | 9.15 | 9.95 | 0.640 | 0.229 | -0.184 | -0.026 | 0.023 | -0.486 | -0.222 | 0.007 | -0.120 |

FIG. 6

METHOD AND SYSTEM FOR FABRICATION AND USE OF A SPECTRAL BASIS FILTER

CROSS-REFERENCES TO RELATED APPLICATIONS

This application claims priority to U.S. Provisional Application No. 63/211,672, filed on Jun. 17, 2021 entitled "Spectral Basis Filter," the disclosure of which is hereby incorporated by reference in its entirety.

BACKGROUND OF THE INVENTION

Spectral imaging is a method of obtaining information related to the optical properties of an object as a function of wavelength. This method is applicable to a variety of applications including remote sensing, product inspection, and medical imaging. Expanding on the three color bands present in red, green, blue (RGB) color images, spectral images can contain hundreds or thousands of spectral bands. Line-scan (i.e., push broom) spectral imaging, wavelength-scan (i.e., staring) spectral imaging, and single shot (i.e., snapshot) spectral imaging have been used.

Despite the progress made in the area of spectral imaging, there is a need in the art for improved methods and systems related to spectral imaging.

SUMMARY OF THE INVENTION

Embodiments of the present invention relate to image processing. More particularly, embodiments of the present invention provide methods and systems for spectral imaging. In a specific embodiment, a method of receiving image data and processing the image data to produce an image associated with a specific spectral profile is provided. The specific spectral profile can be determined before or after image acquisition. Systems to implement the methods described herein are also provided by embodiments of the present invention.

According to an embodiment of the present invention, an optical system is provided. The optical system includes a focal plane array having a plurality of pixels defined by a first number of pixels arrayed in a first direction and a second number of pixels arrayed in a second direction. The optical system also includes an optical filter optically coupled to the focal plane array. The optical filter has a plurality of super-pixels. Each of the plurality of super-pixels includes a predetermined number of sub-pixels and each of the predetermined number of sub-pixels is characterized by one of a plurality of oscillatory transmission profiles as a function of wavelength. In some embodiments, the predetermined number of sub-pixels included in each of the plurality of super-pixels is a square number, for example, the predetermined number of sub-pixels is equal to nine. Each of the predetermined number of sub-pixels can include one or more layers of a film, for example, a single thin film layer. In some embodiments, each of the predetermined number of sub-pixels can be characterized by a different thickness of the single thin film layer.

According to another embodiment of the present invention, a method for defining a spectral profile for an optical filter is provided. The method includes determining one or more characteristics of the spectral profile. The method also includes defining a transmission profile for each of a plurality of sub-pixels, wherein a predetermined number of the plurality of sub-pixels are characterized by an oscillatory transmission profile as a function of wavelength and associating a weight of a set of relative weights with each of the plurality of sub-pixels.

According to yet another embodiment of the present invention, a method is provided. The method includes transmitting an optical signal through an optical filter comprising a plurality of super-pixels. Each of the plurality of super-pixels comprises a plurality of sub-pixels and a predetermined number of the plurality of sub-pixels are characterized by an oscillatory transmission profile as a function of wavelength. The method also includes receiving intensity values associated with each pixel of a detector, wherein each pixel of the detector is associated with one of the plurality of sub-pixels. The detector can include a focal plane array. The method further includes, for each of the plurality of super-pixels, applying a set of relative weights to corresponding intensity values associated with sub-pixels of the plurality of super-pixels and determining an output data.

Numerous benefits are provided by embodiments of the present invention. For example, in some embodiments, an optical system using a spectral basis filter allows for continuous control of bandpass edge definition by varying the relative weights of a linear combination of sub-pixel intensities within a super-pixel block, leading to output images with continuously-tunable spectral bandpass. The linear combination of sub-pixel intensities may be modified in real time or in post-processing. For example, a user of the optical system, or a computer, may determine that the contrast of the output image is not sufficient and modify the set of relative weights that are applied to the sub-pixel intensities to improve the contrast of the output image in real time or in post-processing. In this example, the changes in the set of relative weights result in a change in the output image.

If the optical system is physically distant from a user (e.g., if the optical system is mounted on a remote machine or vehicle, including an aerial platform), the optical system may transmit the intensity values associated with a defined spectral bandpass. This will result in transmission of data at the super-pixel resolution (e.g., 1024×1024), which may be less than the resolution of the focal plane array (e.g., 3072×3072), resulting in significant data compression. In other embodiments, the image data is transmitted at the resolution of the focal plane array (e.g., 3072×3072) and post-processed to provide image data for any specific spectral bandpass at reduced resolution (e.g., 1024×1024).

Additionally, embodiments of the present invention provide high sensitivity, for example the sensitivity of half of a super-pixel with a defined bandpass. In some implementations, the optical system does not use any electromechanical elements and can be completely passive, reducing the risk of a mechanical failure when producing image data. These and other embodiments of the invention along with many of its advantages and features are described in more detail in conjunction with the text below and attached figures.

BRIEF DESCRIPTION OF THE DRAWINGS

FIG. 6 is a table illustrating coefficients used to generate a long pass filter, a notch filter, and multiple bandpass filters according to an embodiment of the present invention.

DETAILED DESCRIPTION OF THE INVENTION

Figure 1:
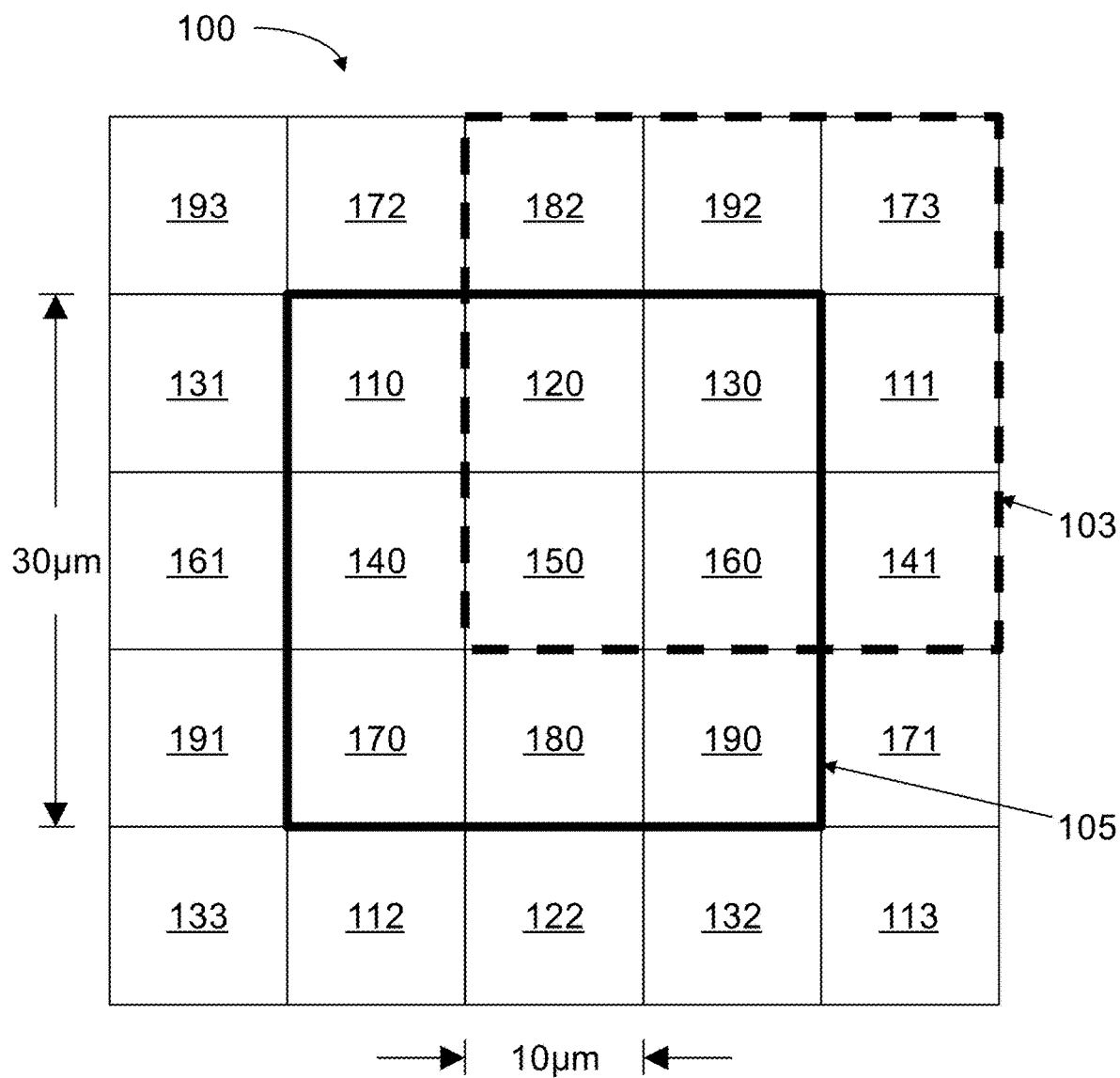
FIG. 1 is an illustrative super-pixel configuration of a spectral basis filter according to an embodiment of the present invention.

Embodiments of the present invention relate to image processing. More particularly, embodiments of the present invention provide methods and systems for spectral imaging. In a specific embodiment, a method of receiving image data and processing the image data to produce an image associated with a specific spectral profile is provided. The specific spectral profile can be determined before or after image acquisition. Systems to implement the methods described herein are also provided by embodiments of the present invention.

As described herein, embodiments of the present invention provide a spectral basis filter that allows arbitrary definition of a spectral bandpass for a focal plane array that can be changed on command during operation. Embodiments of the present invention provide some or all of the capability of a hyperspectral imager in a more compact form than is currently available using conventional techniques. Additionally, embodiments of the present invention significantly reduce the bandwidth required to transmit the measured data. Spectral contrast enhancement can be performed in real-time, automatically, either locally or for the entire imaging array, similar to implementations of Automatic Gain Control. In some embodiments, spectral contrast enhancement provided by embodiments of the present invention is useful for target detection, recognition, and/or identification. One of ordinary skill in the art would recognize many variations, modifications, and alternatives.

Embodiments of the present invention can provide a reconfigurable color imager (RCI) applicable in a variety of spectral imaging systems. As described herein, embodiments of the present invention enable the spectral bandpass profile of a broadband imager to be altered, for example, during operation. Merely by way of example, the spectral bandpass profile of a mobile spectral imager disposed on an aerial vehicle can be modified during flight, initially transmitting light over a first spectral range, for example, within the 8.0 μm to 10.5 μm spectral band, and subsequently transmitting light over a second spectral range within the 8.0 μm to 10.5 μm spectral band. Thus, embodiments of the present invention enable the spectral bandpass to be modified in real-time during operation, for example, initially imaging in a spectral band with a bandwidth of ~0.8 μm centered at 9.4 μm and then later imaging in a spectral band with a bandwidth of ~0.8 μm centered at 9.5 μm. This ability to modify the spectral bandpass enables a system operator to increase image contrast by either accentuating specific spectral bands, excluding spectral bands that are saturating the spectral imager, or the like.

In some embodiments, 16 bands are used to implement multi-spectral imaging, but embodiments of the present invention are not limited to this number of bands and fewer or additional bands can be used. For simplicity and clarity, several exemplary embodiments described herein use 9 bands, but this is merely exemplary. In contrast with some hyper-spectral imagers or multi-spectral imagers that use push broom configurations to obtain two-dimensional image data as a function of wavelength, some embodiments of the present invention support situational awareness for a full array over a single wavelength band and/or at multiple wavelengths, simultaneously or concurrently collecting a two-dimensional array of multi-spectral imaging data.

FIG. 1 is a block diagram of a spectral basis filter according to an embodiment of the present invention. In FIG. 1, a plan view of the spectral basis filter, which can also be referred to as an optical filter, is illustrated. The spectral basis filter 100 may be an optical filter comprising one or more super-pixels. In the embodiment illustrated in FIG. 1, a super-pixel 105 includes a predetermined number of sub-pixels disposed in an array configuration. In the embodiment illustrated in FIG. 1, a first number of sub-pixels 110, 120, 130; 140, 150, 160; or 170, 180, and 190 are arrayed in a first direction and a second number of sub-pixels 110, 140, 170; 120, 150, 180; or 130, 160, 190 are arrayed in a second direction, which can be orthogonal to the first direction. The super-pixels are also disposed in an array configuration (not shown) defining the resolution of the spectral imager. Other spatial configurations of sub-pixels could also be used.

The spectral basis filter 100 illustrated in FIG. 1 is shown as a single super-pixel 105 of size 30 μm×30 μm, thereby forming a spectral imager resolution, also referred to as the display resolution, of 1024×1024. The illustrated super-pixel 105 includes nine sub-pixels of size 10 μm×10 μm, shown as sub-pixels 110, 120, 130, 140, 150, 160, 170, 180, and 190, respectively, in FIG. 1. Thus, the resolution, considered at the sub-pixel level for spectral basis filter 100, is 3072×3072. The particular display and sub-pixel resolution shown in FIG. 1 is merely exemplary and other resolutions can be used, for example, based on a 12 μm 1024×1024 focal plane array (FPA). One of ordinary skill in the art would recognize many variations, modifications, and alternatives.

Figure 2:
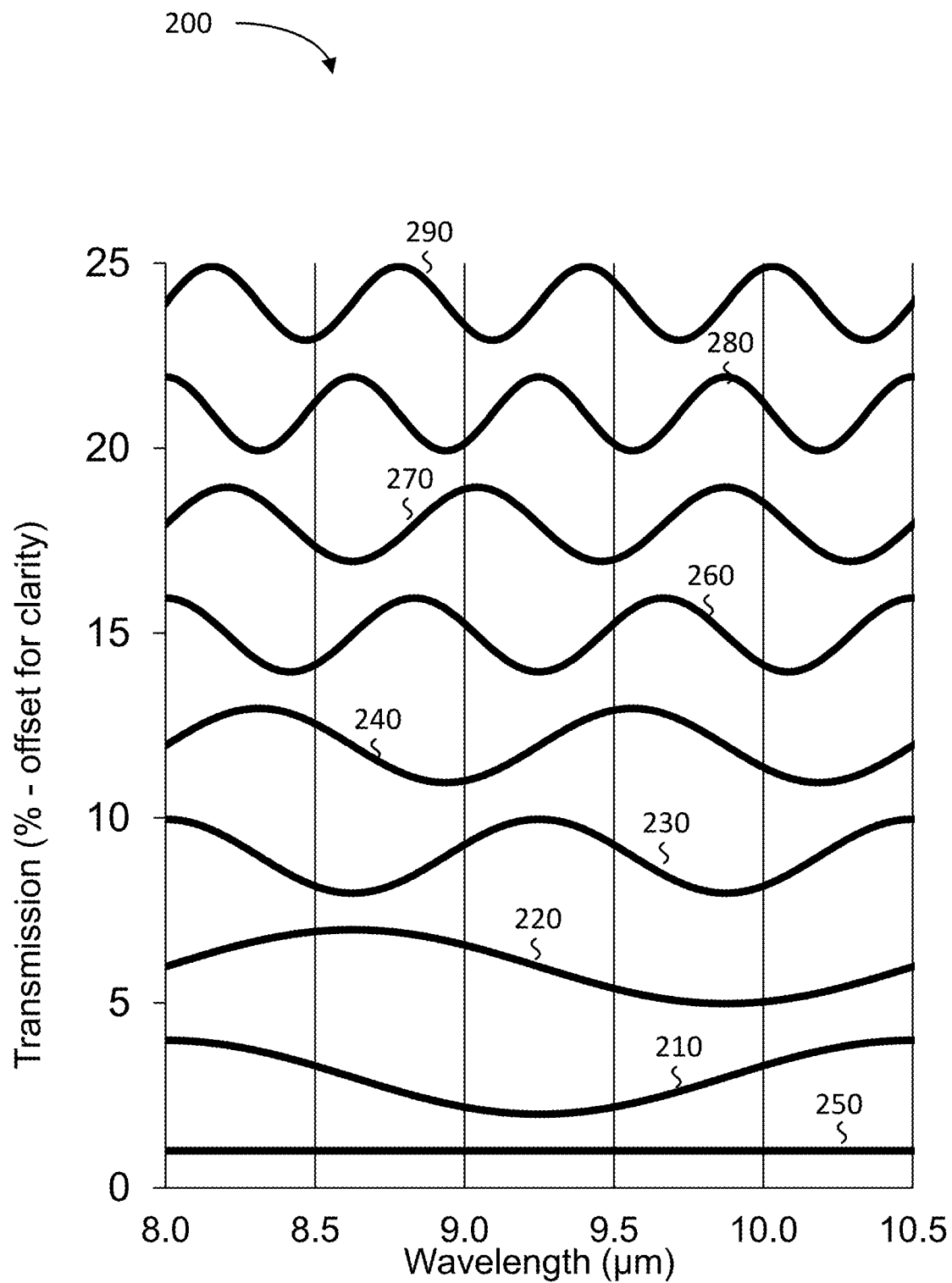
FIG. 2 is a graph of transmission as a function of wavelength for a plurality of sub-pixels in a super-pixel according to an embodiment of the present invention.
Figure 3A:
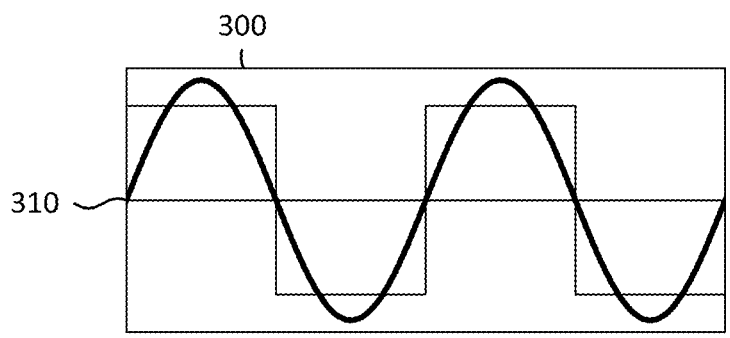
FIGS. 3A-3D are graphs illustrating reconstruction of a square wave function through the linear combination of basis function elements.
Figure 3B:
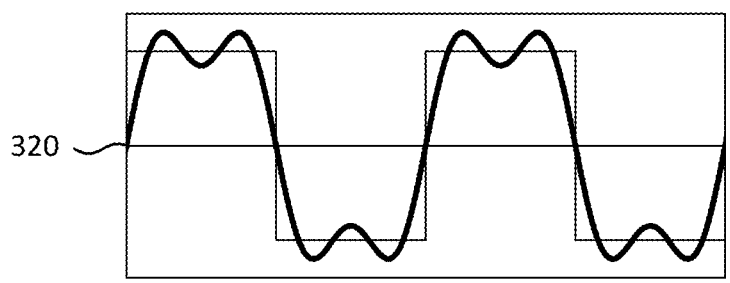
Figure 3C:
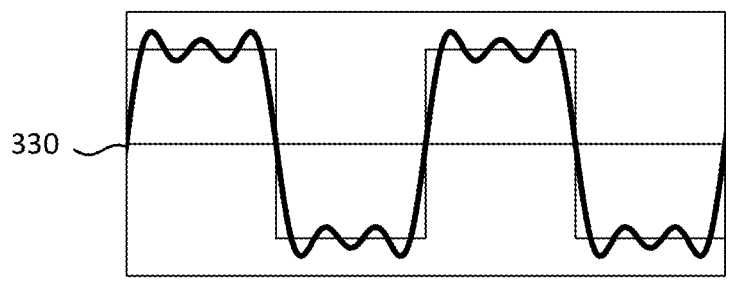
Figure 3D:
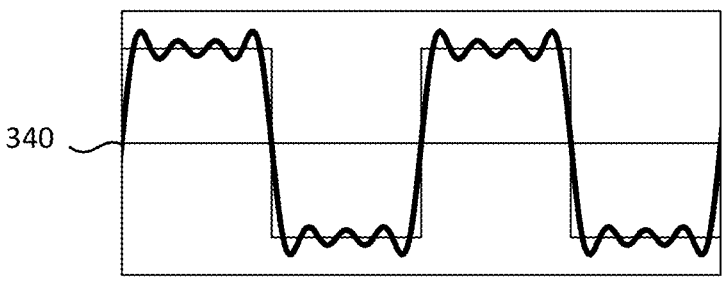

Each of the nine sub-pixels 110, 120, 130, 140, 150, 160, 170, 180, and 190 may be implemented as an optical filter that is characterized by an oscillatory transmission profile as a function of wavelength as discussed more fully in relation to FIG. 2. For example, the first sub-pixel 110 may have an oscillatory transmission profile that transmits light incident on the first sub-pixel 110 according to an oscillatory function. Thus, in contrast with conventional optical filters that transmit predetermined wavelengths, for example, a notch filter that transmits light in the wavelength range from 8.0 μm to 8.2 μm, one or more of the sub-pixels are characterized by an oscillatory profile as a function of wavelength. Thus, as described more fully in relation to FIG. 2, one or more of the sub-pixels will have a transmission profile that oscillates between a minimum transmission value (e.g., zero transmission) and a maximum transmission value (e.g., full transmission) a number of times over the wavelength range of interest.

Thus, in contrast with conventional optical filters that detect over a single spectral band, the sub-pixels discussed herein transmit light across the entire spectral band of the spectral imager, for example, 8.0 µm to 10.5 µm, albeit with a varying transmission value as a function of wavelength. Accordingly, a sub-pixel detector element, for example, a pixel of a long wavelength infrared detector, will detect light across the entire spectral band, transmitting light to the detector element in accordance with its oscillatory spectral transmission profile.

The output of the super-pixel 105 may be formed as a linear superposition of the weighted intensities of the array of sub-pixels in the super-pixel. Accordingly, the bandwidth of the super-pixel can be defined in accordance with the weights applied to each of the sub-pixels, which are, as discussed more fully herein, characterized by oscillatory transmission profiles. Thus, in contrast with conventional systems in which the bandwidth of the spectral imager is defined by the bandwidth of the spectral filters associated with the detector elements, embodiments of the present invention enable the bandwidth of the spectral imager to be modified as a result of selection of a specific linear superposition of the weighted intensities of the array of sub-pixels in the super-pixel. Therefore, the bandwidth of the spectral imager can be modified after data collection, for instance, by a user of an optical system comprising the spectral basis filter 100 or by a processor of the optical system at any time after data from the spectral basis filter 100 is collected. For example, a specific spectral profile, such as that corresponding to a long pass filter, may be applied to the output of the detector elements of the spectral imager using spectral basis filter 100. Alternatively, a different specific spectral profile, for example, a short pass filter, can be implemented through post-processing of the same output from the detector elements of the spectral imager.

As discussed above, each of the plurality of sub-pixels 110, 120, 130, 140, 150, 160, 170, 180, and 190 of the spectral basis filter 100 may have a unique oscillatory transmission profile as discussed more fully in relation to FIG. 2. Accordingly, the oscillatory transmission profile associated with each sub-pixel can then be used to determine the weights applied to the intensity values that are output from the detector elements corresponding to each specific sub-pixel.

Although some embodiments are implemented in a manner such that the detector element associated with each sub-pixel only detects light associated with each sub-pixel, in other embodiments an optical element is utilized to blur the image formed by the detector elements in the focal plane array, resulting in a blur circle on the order of the size of the super-pixel. Accordingly, when the optical filter is optically coupled to a focal plane array, light passing through the sub-pixels in a particular super-pixel will be imaged substantially uniformly by the detector elements of the focal plane array associated with the super-pixel. Accordingly, some implementations use optical systems that image at the size of the super-pixel, not the size of the sub-pixels, thereby improving system performance.

FIG. 2 is a graph of transmission as a function of wavelength for a plurality of sub-pixels in a super-pixel according to an embodiment of the present invention. As illustrated in FIG. 2, a set of overlaid plots of transmission as a function of wavelength, each associated with one of the sub-pixels illustrated in FIG. 1, are shown. Unlike many optical filters, such as Bayer filters, each sub-pixel can be constructed from a layer of thin film, resulting in an oscillatory transmission profile rather than a single transmission peak corresponding to a specific band of light.

Referring to FIG. 2, the graph 200 shows eight oscillatory transmission profiles 210, 220, 230, 240, 260, 270, 280, and 290, which correspond to the nine sub-pixels 110, 120, 130, 140, 160, 170, 180, and 190, respectively, of the spectral basis filter 100 of FIG. 1. In the embodiment illustrated in FIG. 2, each of the plurality of oscillatory transmission profiles is distinct from others of the plurality of oscillatory transmission profiles. The amplitudes of each of the eight oscillatory transmission profiles may vary from zero to one but are shown offset in FIG. 2 for clarity. Thus, referring to exemplary oscillatory transmission profile 210, the amplitude of the transmission ranges between zero and one over the wavelength range of 8.0 µm to 10.5 µm. The amplitude of transmission is one at 8.0 µm and 10.5 µm and zero at 9.25 µm. Ninth transmission profile 250 is a uniform transmission profile with an amplitude of one (i.e., transmits all light equally). Thus, sub-pixel 150 is transparent and transmits all wavelengths. Accordingly, ninth transmission profile 250, corresponding to sub-pixel 150, provides full situational awareness for any optical signal filtered by the spectral basis filter 100. Of course, sub-pixel 150 could also have an oscillatory profile in other embodiments.

In the embodiment illustrated in FIG. 2, oscillatory transmission profile 210 oscillates a single time over the wavelength range of 8.0 µm to 10.5 µm, with a phase profile such that peaks in transmission are aligned with 8.0 µm and 10.5 µm. Oscillatory transmission profile 220 also oscillates one time over the wavelength range of 8.0 µm to 10.5 µm but has a π radian phase shift relative to profile 210. Oscillatory transmission profile 230 oscillates twice over the wavelength range of 8.0 µm to 10.5 µm, and the like, with oscillatory transmission profile 290 oscillating four times over the wavelength range of 8.0 µm to 10.5 µm. The oscillatory behavior of each of the transmission profiles is not limited to this particular set and each of the sub-pixels can be modified to result in additional sets of oscillatory behaviors. As illustrated in FIG. 2, each of the plurality of the oscillatory transmission profiles is characterized by a unique oscillation frequency and phase, which can be referenced in terms of wavelength measured in microns, wavenumber measured in cm', or frequency measured in Hertz. Thus, the illustrated oscillatory transmission profiles are exemplary, and embodiments of the present invention are not limited to these particular nine oscillatory profiles. One of ordinary skill in the art would recognize many variations, modifications, and alternatives.

The output intensity value of each sub-pixel may be determined by the oscillatory transmission profile of the sub-pixel, and the total transmission of the super-pixel may be a linear combination of the weighted intensity values of all the sub-pixels in the super-pixel. Thus, as described more fully herein, the output (i.e., the intensity value) from each detector element associated with each sub-pixel will be weighted and summed with the outputs from the other detector elements to form a weighted output at the super-pixel resolution.

FIGS. 3A-3D are graphs illustrating the reconstruction of a square wave function through the linear combination of basis functions. A basis of a vector space vector V is defined as a subset $v_1, \ldots, v_n$ of vectors in the vector space V that are linearly independent and span the vector space. As will be evident to one of skill in the art, a set of vectors ($v_1, v_2, \ldots, v_n$) in V form a basis if and only if every v EV can be uniquely written as $v=a_1v_1+a_2v_2+ \ldots +a_nv_n$, where $a_1, \ldots, a_n$ are elements of the base field. This holds true, not only for vectors in the Euclidean space of classical geometry (x, y, z), but also for arbitrary functions in the space V. Transformations express a function in V through a weighted linear combination of basis vectors. Examples of basis functions include: polynomials (Taylor series), Bessel functions (Hankel), wavelets (Harr), and complex exponentials (Fourier transforms). A spectral bandpass envelope defines a function in a 1-D vector space. A linear combination of a small number of terms in the appropriate basis can efficiently approximate the spectral bandpass function. The fidelity of the approximation for a specified number of terms is largely determined by the suitability of the basis used for approximation.

As illustrated in FIGS. 3A-3D, a set of functions may be a set of basis functions for a space if the set of functions can be used to reconstruct any arbitrary function in the space. The set of basis functions can be used to calculate a weight for a specific basis function to approximate a desired function. The basis functions used in FIG. 3 are sinusoidal functions (e.g., sine and/or cosine functions of different amplitudes and phases), used to calculate a Fourier expansion of the square wave function 300. The first Fourier expansion 310 may be the Fourier expansion with only one basis function, which loosely approximates the square wave function 300 by approximating it with a single sine function. As the order of the Fourier expansion increases to the second Fourier expansion 320, the approximation of the square wave function 300 becomes better, as another sine function is added to the first according to some weight (e.g., $w_1$*sin(x)+$w_2$*cos(x)). Higher orders of expansion, such as the third Fourier expansion 330 and the fourth Fourier expansion 340, may increase the accuracy of the approximation of the square wave function 300, as more sinusoidal terms are added to the approximation.

In general, the Fourier expansion of a function $f(x)$ with a period of 2 L can be calculated using the following equations:

$$f(x) = \frac{1}{2}a_0 + \sum_{n=1}^{\infty} \left[a_n\cos\left(\frac{n\pi x}{L}\right) + b_n\sin\left(\frac{n\pi x}{L}\right)\right]$$

$$a_n = \frac{1}{L}\int_{-L}^{L}\cos\left(\frac{n\pi x}{L}\right)f(x)dx$$

$$b_n = \frac{1}{L}\int_{-L}^{L}\sin\left(\frac{n\pi x}{L}\right)f(x)dx$$

The technique of Fourier expansion can be applied when operating the spectral basis filter. A linear combination of the sub-pixel intensities can be used to efficiently construct a desired spectral profile. By varying the weights in the linear combination of the sub-pixel oscillatory transmission profiles, it is possible to adjust the spectral band edges continuously, in real-time or in post-processing if the full array is read out.

Figure 4A:
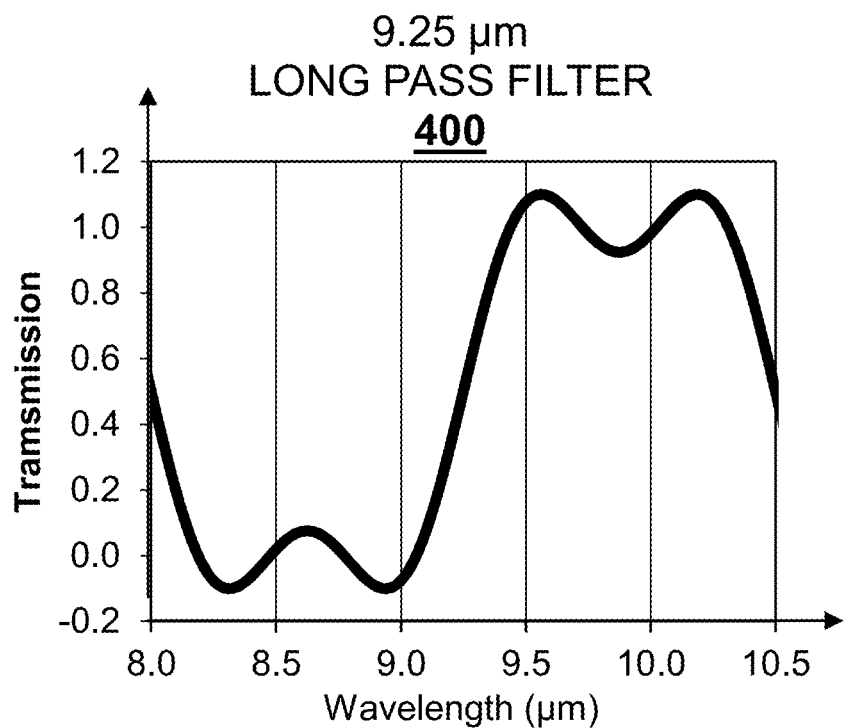
FIGS. 4A and 4B are plots illustrating a spectral profile as a function of wavelength for a long pass filter and a notch filter, respectively, according to an embodiment of the present invention.
Figure 4B:
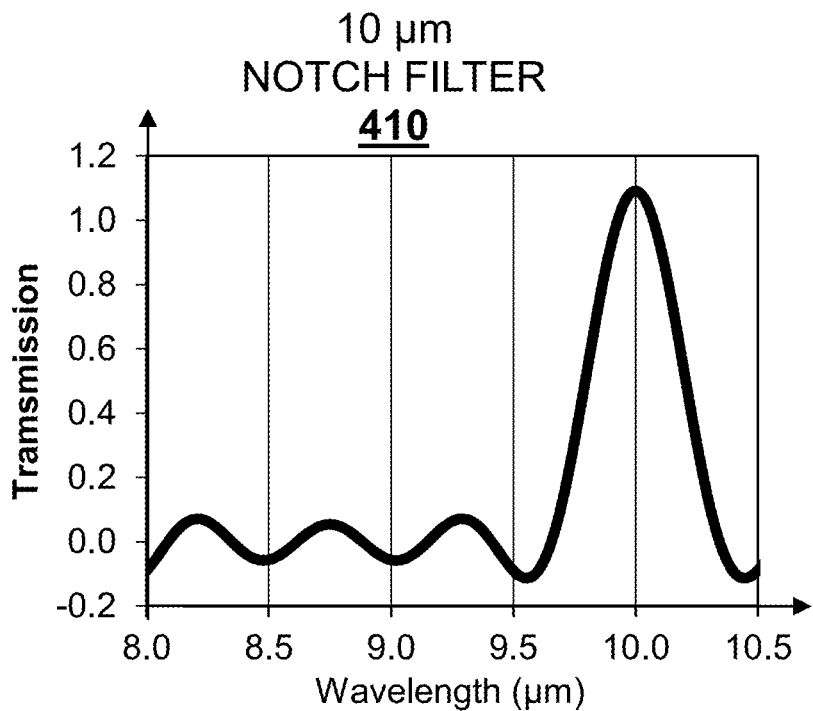

FIGS. 4A and 4B are plots illustrating a spectral profile as a function of wavelength for a long pass filter and a notch filter, respectively, according to an embodiment of the present invention. As described above, by varying the relative weights of the combination of sub-pixel intensities of the spectral basis filter (e.g., as described in the oscillatory transmission profiles of FIG. 2), the spectral profile of the spectral basis filter may be adjusted continuously. In some implementations, if the full array is read out, post-processing can be used to modify the relative weights after acquisition of an image, enabling the spectral profile as a function of wavelength to be modified after image capture.

Referring to FIGS. 4A and 4B, the combination of sub-pixel oscillatory transmission profiles may be used to approximate various optical filters. In FIG. 4A, a long pass filter 400 is illustrated that is characterized by low transmission for wavelengths less than 9.25 µm and high transmission for wavelengths greater than 9.25 µm. Thus, a 9.25 µm long pass filter can be implemented by varying the relative weights of the basis vectors (i.e., the sub-pixel intensities). In FIG. 4B, a notch filter 410 is illustrated that is characterized by low transmission for wavelengths less than 9.8 µm and high transmission between 9.8 µm and 10.2 µm. Thus, a notch filter at 10 µm can be implemented. These filters are merely exemplary and other filters with differing bandwidths, center wavelengths, cutoff wavelengths, and the like can be implemented according to embodiments of the present invention.

Moreover, the filters may be adjusted in real-time or in post-processing if the full array is read out. For example, initially, the long pass filter 400 may be implemented, but in post-processing it may be determined that the notch filter 410 is more suitable for imaging. The spectral profile may be finely tuned, by adjusting the weights in the linear combination of sub-pixel oscillatory transmission profiles, to enhance contrast in an image that an optical system including the spectral basis filter reads. As such, the technique provides hyperspectral benefits (e.g., high spectral resolution) while having a low data load as the data used to adjust the spectral profile is a set of weights that is assigned to the plurality of sub-pixels. Additionally, the sensitivity (e.g., collection efficiency multiplied by collection area) of the spectral basis filter is high as each sub-pixel passes half of the incident flux in the spectral bandpass. Thus, referring to FIG. 2, the light passed by each oscillatory transmission profile averages to a quantum efficiency of 50% across the 8.0 µm-10.5 µm band. Accordingly, over the 8.0 µm-10.5 µm band, half of the incident light is passed by the spectral basis filter. Moreover, the collection area (i.e., the total size of the spectral basis filter) is large compared to traditional optical filters, which may be comparable to the size of a single sub-pixel. Since each super-pixel, which can be on the order of 30 µm×30 µm, transmits incident light with a quantum efficiency of 50%, integration of light over the entire super-pixel results in high sensitivity. Thus, embodiments of the present invention enable image contrast enhancement by providing continuous control over the spectral bandpass.

FIGS. 5A-5D are plots illustrating spectral profiles for a bandpass filter as a function of wavelength demonstrating continuous band edge variability according to an embodiment of the present invention. These figures show four spectral profiles as a function of wavelength for a bandpass filter that provides continuous band edge variability using the spectral basis filter described herein. In the exemplary spectral profiles shown in FIGS. 5A-5D, the spectral band edge of the bandpass filter is continuously varied as the linear combination of the sub-pixel oscillatory transmission profiles is modified.

More specifically, a Fourier expansion may be calculated using the oscillatory transmission profiles of the sub-pixels. For example, a function $f(\lambda)$ can be approximated using the following equations:

$$f(\lambda) = \frac{1}{2}a_0 + \sum_{n=1}^{4}\left[a_n\cos\left(\frac{2n\pi\lambda}{\lambda_L - \lambda_S}\right) + b_n\sin\left(\frac{2n\pi\lambda}{\lambda_L - \lambda_S}\right)\right]$$

Figure 5A:
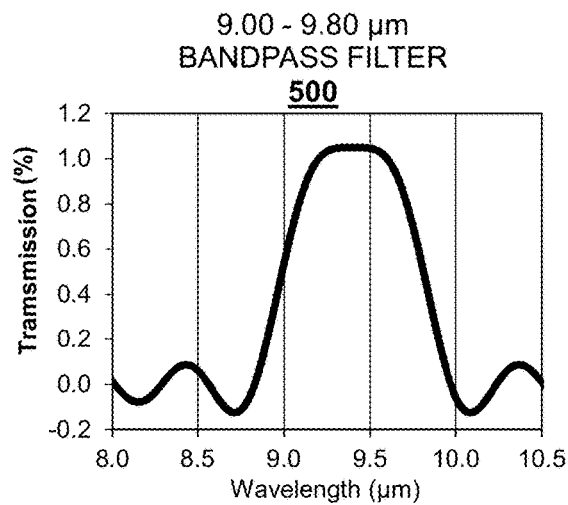
FIGS. 5A-5D are plots illustrating spectral profiles for a bandpass filter as a function of wavelength demonstrating continuous band edge variability according to an embodiment of the present invention.
Figure 5B:
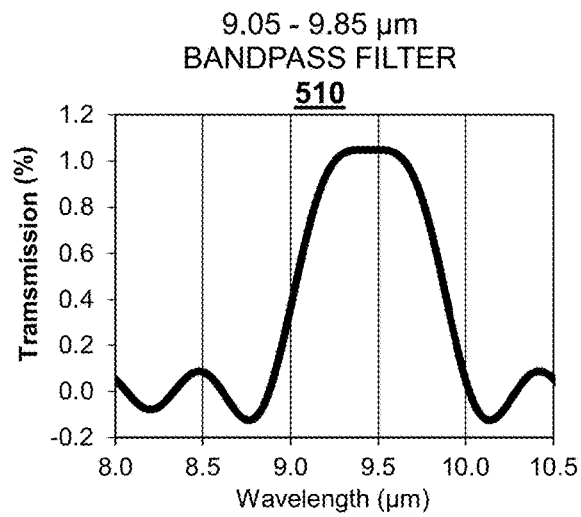
Figure 5C:
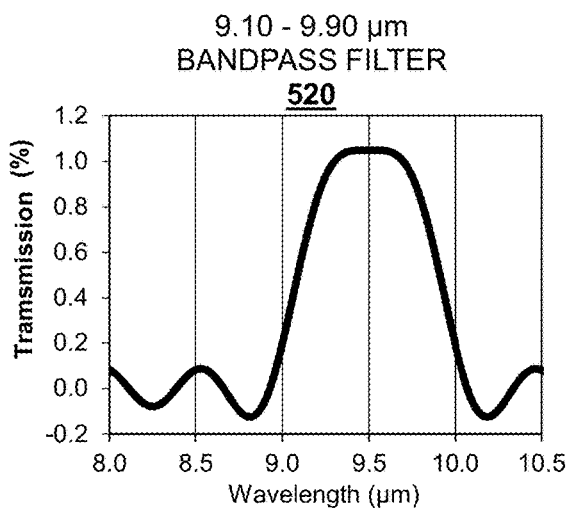
Figure 5D:
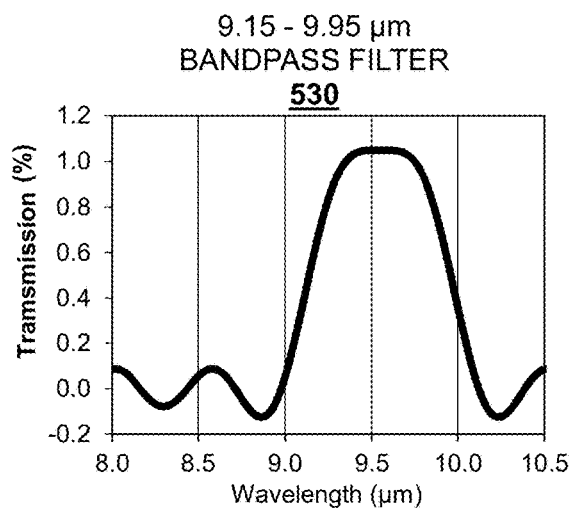

-continued $$a_0 = 2\frac{\lambda_l - \lambda_s}{\lambda_L - \lambda_S}$$

$$a_n = \frac{1}{n\pi}\left[\sin\left(\frac{2n\pi\lambda_l}{\lambda_L - \lambda_S}\right) - \sin\left(\frac{2n\pi\lambda_s}{\lambda_L - \lambda_S}\right)\right]$$

$$b_n = \frac{1}{n\pi}\left[\cos\left(\frac{2n\pi\lambda_s}{\lambda_L - \lambda_S}\right) - \cos\left(\frac{2n\pi\lambda_l}{\lambda_L - \lambda_S}\right)\right]$$

where $\lambda_s$ is the bandpass short edge (e.g., 9.0 µm in the first bandpass filter 500 illustrated in FIG. 5A), $\lambda_l$ is the bandpass long edge (e.g., 9.8 µm in the first bandpass filter 500), $\lambda_S$ is the spectral range cut-on (e.g., 8.0 µm in the first bandpass filter 500), and $\lambda_L$ is the spectral range cut-off (e.g., 10.5 µm in the first bandpass filter 500). As illustrated in FIGS. 5B-5D, other values for the parameters associated with a particular bandpass filter can be used to provide different spectral properties. Thus, bandpass filter 510 illustrated in FIG. 5B is characterized by the parameters $\lambda_s$=9.05 µm; $\lambda_l$=9.85 µm; $\lambda_S$=8.0 µm; and $\lambda_L$=10.5 µm. Bandpass filter 520 illustrated in FIG. 5C is characterized by the parameters $\lambda_s$=9.1 µm; $\lambda_l$=9.9 µm; $\lambda_S$=8.0 µm; and $\lambda_L$=10.5 µm. Bandpass filter 530 illustrated in FIG. 5D is characterized by the parameters $\lambda_s$=9.15 µm; $\lambda_l$=9.95 µm; $\lambda_S$=8.0 µm; and $A_L$=10.5 µm. In some embodiments, the spectral bandwidth for the bandpass filter can be on the order of 0.4 µm, as in bandpass filter 410. In other embodiments, as illustrated in FIGS. 5A-5D, the spectral bandwidth for the bandpass filter can be on the order of 0.8 µm. Depending on the particular design, the spectral bandwidth can be selected as appropriate to the particular application. One of ordinary skill in the art would recognize many variations, modifications, and alternatives.

FIG. 6 is a table illustrating coefficients used to generate a long pass filter, a notch filter, and multiple bandpass filters according to an embodiment of the present invention. In FIG. 6, the values used for the spectral characteristics and the coefficients for the weights are illustrated for the long pass filter 400 and the notch filter 410 shown in FIGS. 4A and 4B, respectively, as well as the bandpass filters 500-530 shown in FIGS. 5A-5D, respectively. In this example, the nine coefficients $a_0$-$a_4$ and $b_1$-$b_4$ may be a set of relative weights that correspond to the nine sub-pixels 110, 120, 130, 140, 150, 160, 170, 180, and 190, of the spectral basis filter shown in FIG. 1. The constant coefficient $a_0$ may be calculated using, for example, the sub-pixel 150 shown in FIG. 1. The sub-pixel 150 transmits all light equally, as shown by the ninth transmission profile 250 in FIG. 2, and can be used to calculate the necessary offset ($a_0$) of the Fourier expansion.

The examples shown in FIGS. 5A-5D demonstrate continuous band edge variability. The band edges are shown to be varied by 0.05 µm between each bandpass filter (e.g., the band edges corresponding to the first bandpass filter 500 are shifted by 0.05 µm in the second bandpass filter 510). However, smaller or larger changes in band edges may be created by changing the Fourier expansion. As the oscillatory transmission functions shown in FIG. 2 are continuous, by modifying the Fourier expansion, the band edges may also be adjusted continuously. The spectral profiles included in the table shown in FIG. 6 may be stored as a look-up table in a memory of an optical system that comprises the spectral basis filter. The table may be accessed as a look-up table, by inputting one or more characteristics in the spectral profile, such as the band edges $\lambda_s$, $\lambda_l$, $\lambda_S$, and $\lambda_L$, to receive the relative weights $a_0$-$a_4$ and $b_1$-$b_4$. One of ordinary skill in the art would recognize many variations, modifications, and alternatives.

Figure 7:
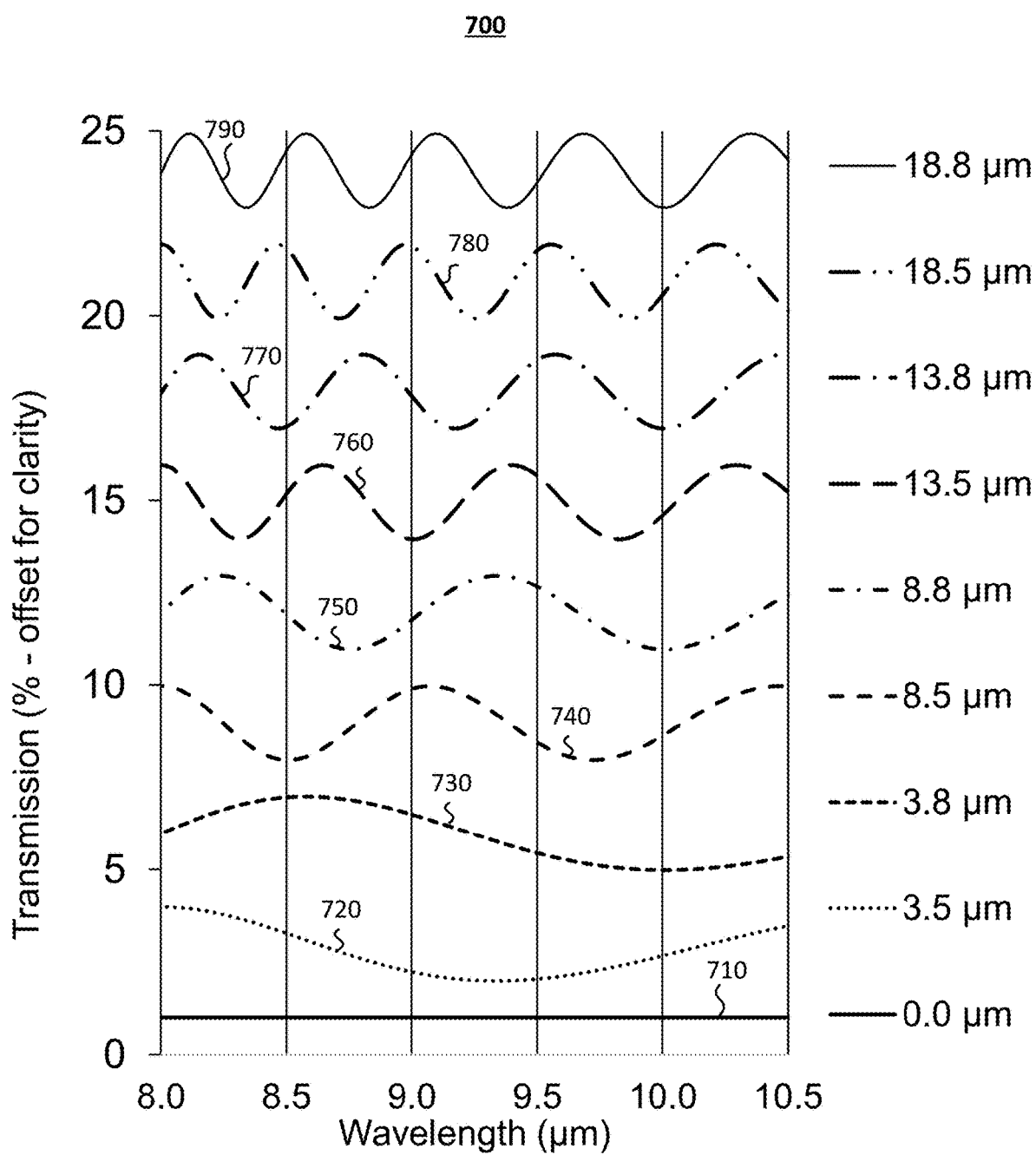
FIG. 7 is a graph of transmission as a function of wavelength for each sub-pixel in a super-pixel according to an embodiment of the present invention.

FIG. 7 is a graph of transmission as a function of wavelength for each sub-pixel in a super-pixel according to an embodiment of the present invention. In FIG. 7, the transmission as a function of wavelength for sub-pixels constructed using a thin film is illustrated. To construct the sub-pixels in the spectral basis filter, a single layer of thin film may be used. The thickness and index of refraction of the thin film over each sub-pixel will determine the oscillating spectral transmission profile for the sub-pixel. The oscillation as a function of wavelength can also be represented in terms of wavenumber or frequency. Thus, similar computations can be performed in wavenumber space in which the oscillations will be sinusoidal. The transmission profiles illustrated in FIG. 7 correspond to thin film thicknesses of 0 µm, 3.5 µm, 3.8 µm, 8.5 µm, 8.8 µm, 13.5 µm, 13.8 µm, 18.5 µm, and 18.8 µm for the nine sub-pixels, respectively. It will be noted that when the spectral scale is converted from wavenumber to wavelength, the oscillatory transmission distorts at the bandpass long edge, but generally follows the oscillatory transmission profile previously described in FIG. 2. Thus, the technique of using a Fourier expansion to approximate different filters may be applied when the sub-pixels are constructed using a single layer of thin film. In other embodiments, multiple layers of thin films may be used to construct the sub-pixels with similar oscillatory transmission profiles.

In the embodiment illustrated in FIG. 7, each of the plurality of sub-pixels of the spectral basis filter is constructed using a single layer of thin film material. The thin film may include one or more layers of a material (e.g., high index materials that are substantially transparent in the infrared such as germanium, silicon, zinc sulfide, zinc selenide, etc.) deposited as a uniform layer in an array format corresponding to the super-pixel array dimensions, for example, onto a filter substrate (e.g., germanium, silicon, zinc sulfide, zinc selenide, etc.). The sub-pixel array may then be patterned (e.g., through lithography and timed etching) to achieve a desired film thickness for each sub-pixel in the array. In some embodiments, the thin film(s) may be deposited directly on the focal plane array.

FIG. 7 shows the oscillatory transmission profiles that correspond to sub-pixels constructed from single layer thin films of varying thickness. Thus, the first oscillatory transmission profile 710 may correspond to a thin film of 0.0 µm thickness, meaning the corresponding sub-pixel transmits all light equally independent of wavelength. The second oscillatory transmission profile 720 may correspond to a thin film of 3.5 µm thickness. The other seven oscillatory transmission profiles 730, 740, 750, 760, 770, 780, and 790 correspond to thin films of thickness ranging of 3.8 µm, 8.5 µm, 8.8 µm, 13.5 µm, 13.8 µm, 18.5 and 18.8 µm, respectively, as shown in FIG. 7.

Although a single layer thin film may be used, with each sub-pixel including the same material, for example, germanium deposited on a zinc selenide substrate, but having differing thicknesses, embodiments of the present invention are not limited to this particular implementation. In other embodiments, multiple layers of different materials can be used, each sub-pixel can include different materials, some sub-pixels can include a single material whereas other sub-pixels can include two or more materials, or the like. One of ordinary skill in the art would recognize many variations, modifications, and alternatives.

Figure 8:
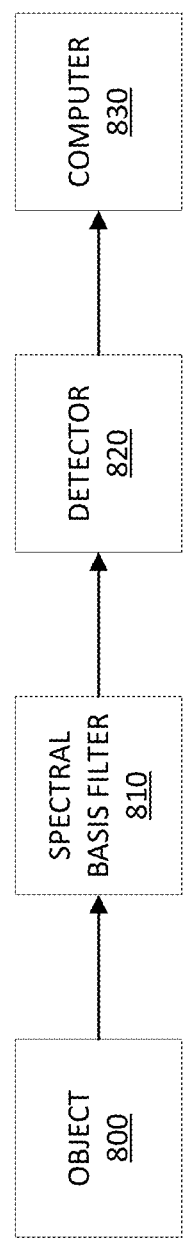
FIG. 8 shows a block diagram of an optical system with a spectral basis filter.

FIG. 8 shows a block diagram of an optical system comprising a spectral basis filter. The optical system may be used to image an object 800. The object 800 may emit an optical signal (e.g., infrared light, etc.) transmitted through the spectral basis filter 810. One or more super-pixels in the spectral basis filter 810 may filter the optical signal received according to an array of sub-pixels in the one or more super-pixels. After filtering the optical signal, a detector 820 that is optically coupled to the spectral basis filter may read the optical signal to receive intensity values associated with each pixel of the detector, for example, a focal plane array. Each pixel in the detector, which may be a focal plane array, may be associated with the transmission of one of the sub-pixels in the array of sub-pixels, for each super-pixel of the spectral basis filter 810.

After receiving intensity values for all sub-pixels of the spectral basis filter 810, the detector 820 may transmit the intensity values to a computer 830, which can be implemented as a computation module. The computer 830 may determine a first set of relative weights that will be applied to each intensity value received from the plurality of sub-pixels. The computer 830 may determine a spectral profile that will be applied to the intensity values. For example, the characteristics of a spectral profile can include band edges and general shape. To apply the desired spectral profile to the intensity values, the computer 830 may store a table, similar to the table illustrated in FIG. 6, and determine that a 9.00-9.80 µm bandpass filter is to be applied. The computer 830 may then access the table to retrieve the first set of relative weights $a_0$-$a_4$ and $b_1$-$b_4$ associated with the 9.00-9.80 µm bandpass filter and apply the appropriate relative weight to the intensity value of the corresponding sub-pixel. In other examples, a Fourier expansion may be performed before or after receiving the intensity values to calculate the first set of relative weights that will be applied. For each of the one or more super-pixels in the spectral basis filter 810, the first set of relative weights may be applied to the corresponding sub-pixels in the one or more super-pixels to determine a first output (e.g., a first image). In this way, the computer/computation module effectively modulates the signal intensity transmitted by each of the predetermined number of sub-pixels in the weighted sum of sub-pixel signal intensities for the super-pixel.

The computer 830, or a user operating the computer 830, may determine that a second set of relative weights may be calculated to increase the contrast of the first output image. The computer 830 may then access the table or compute a second Fourier expansion to determine a second set of relative weights. The second set of relative weights may then be applied to the corresponding sub-pixels in the one or more super-pixels to determine a second output (e.g., a second image). A first contrast score may be computed for the first image and a second contrast score may be computed for the second image. The contrast scores may be determined from, for example, the level and span of intensity values across the images. After computing the contrast scores, the computer 830 may compare the first contrast score to the second contrast score. If the first contrast score is greater than the second contrast score (e.g., the first image has greater contrast than the second image), then the computer 830 may re-apply the first set of relative weights to the intensity values. If the first contrast score is less than the second contrast score, the computer 830 may leave the second image as is or attempt to determine a third set of relative weights to improve the second contrast score further.

Figure 9:
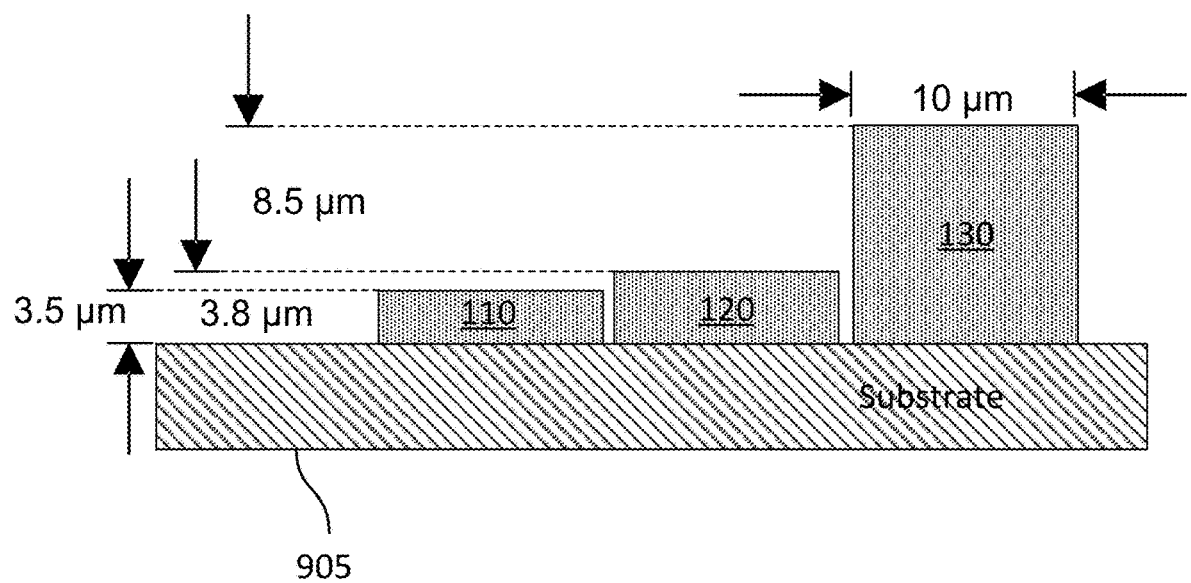
FIG. 9 is a cross-section diagram illustrating three sub-pixels of a super-pixel according to an embodiment of the present invention.

FIG. 9 is a cross-section diagram illustrating three sub-pixels of a super-pixel according to an embodiment of the present invention. As illustrated in FIG. 9, sub-pixels 110, 120, and 130 shown in FIG. 1 have varying thin film thickness as discussed in relation to FIG. 7. Referring to FIG. 9, sub-pixel 110 has a thickness of 3.5 µm and a lateral width of 10 µm, sub-pixel 120 has a thickness of 3.8 µm and a lateral width of 10 µm, and sub-pixel 130 has a thickness of 8.5 µm and a lateral width of 10 µm. These thicknesses correspond to the thicknesses of oscillatory transmission profiles 720, 730, and 740 in FIG. 7. The other six pixels in this exemplary embodiment would have thicknesses associated with the six other oscillatory transmission profiles shown in FIG. 7, including a thickness of 0.0 µm (i.e., no thin film) for one of the sub-pixels, for example, the center sub-pixel in the super-pixel. The arrangement of sub-pixels in FIG. 9 is one example, though other configurations may be chosen to optimize lithographic processing or optical performance.

As discussed above, the thin films illustrated in FIG. 9 can be fabricated by depositing a uniform thickness layer on substrate 905 and then using lithography and etching to define the thickness of each sub-pixel. Separation between sub-pixels can be implemented in the spectral basis filter as illustrated in FIG. 9, but this is not required by the present invention.

Figure 10:
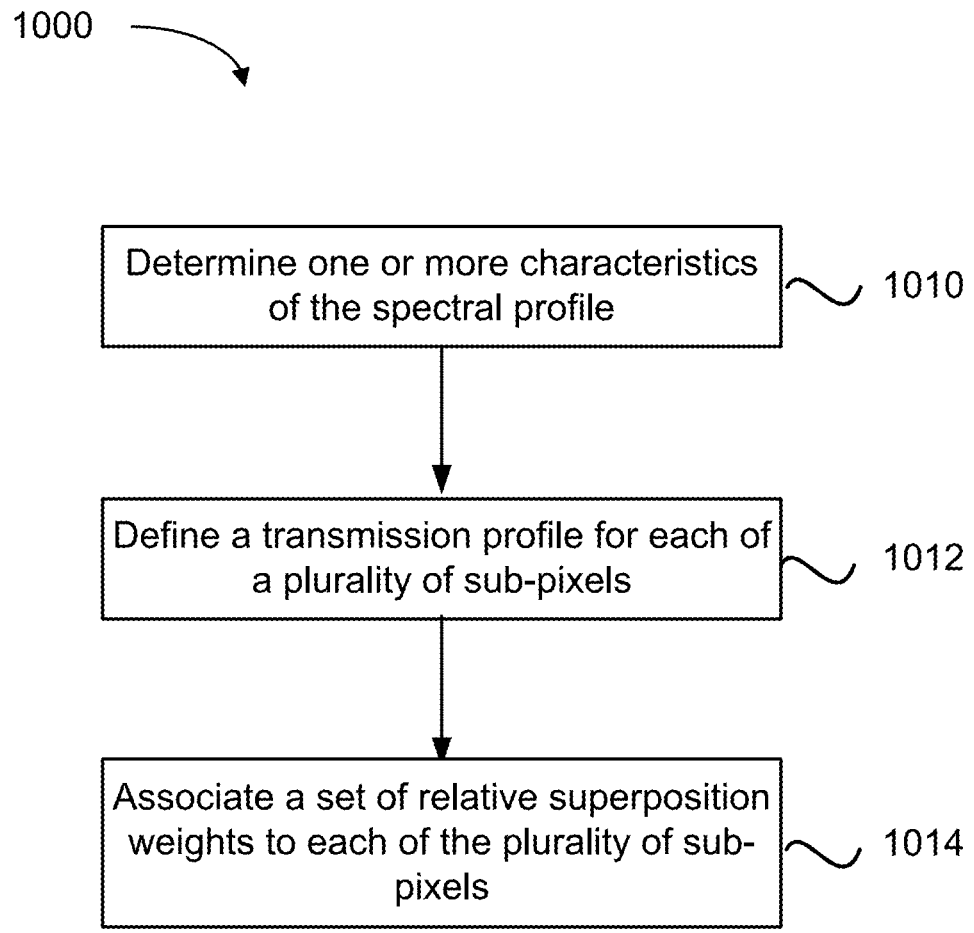
FIG. 10 is a simplified flowchart illustrating a method of defining a spectral profile for an optical filter according to an embodiment of the present invention.

FIG. 10 is a simplified flowchart illustrating a method of defining a spectral profile for an optical filter according to an embodiment of the present invention. The method 1000 includes determining one or more characteristics of the spectral profile (1010). The one or more characteristics of the spectral profile can include at least one of a bandpass short edge, a bandpass long edge, a spectral range cut-on, or a spectral range cut-off. The method also includes defining a transmission profile for each of a plurality of sub-pixels (1012). A predetermined number of the plurality of sub-pixels are characterized by an oscillatory transmission profile as a function of wavelength. Defining the transmission profile for each of the plurality of the plurality of sub-pixels can include determining a thickness of a thin film associated with each of the plurality of sub-pixels as illustrated in FIG. 9.

The method further includes associating a set of relative superposition weights to each of the plurality of sub-pixels (1014). In some embodiments, the set of relative weights is determined by accessing a look-up table of weights using the one or more characteristics of the spectral profile. In an embodiment, the method also includes determining a first contrast score using an output of the optical filter, modifying at least one weight in the set of relative weights to define a modified set of relative weights, associating a modified weight of the modified set of relative weights with each of the plurality of sub-pixels, determining a second contrast score using the output of the optical filter with a modified set of relative weights, and determining that the second contrast score is greater than the first contrast score.

It should be appreciated that the specific steps illustrated in FIG. 10 provide a particular method of defining a spectral profile for an optical filter according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
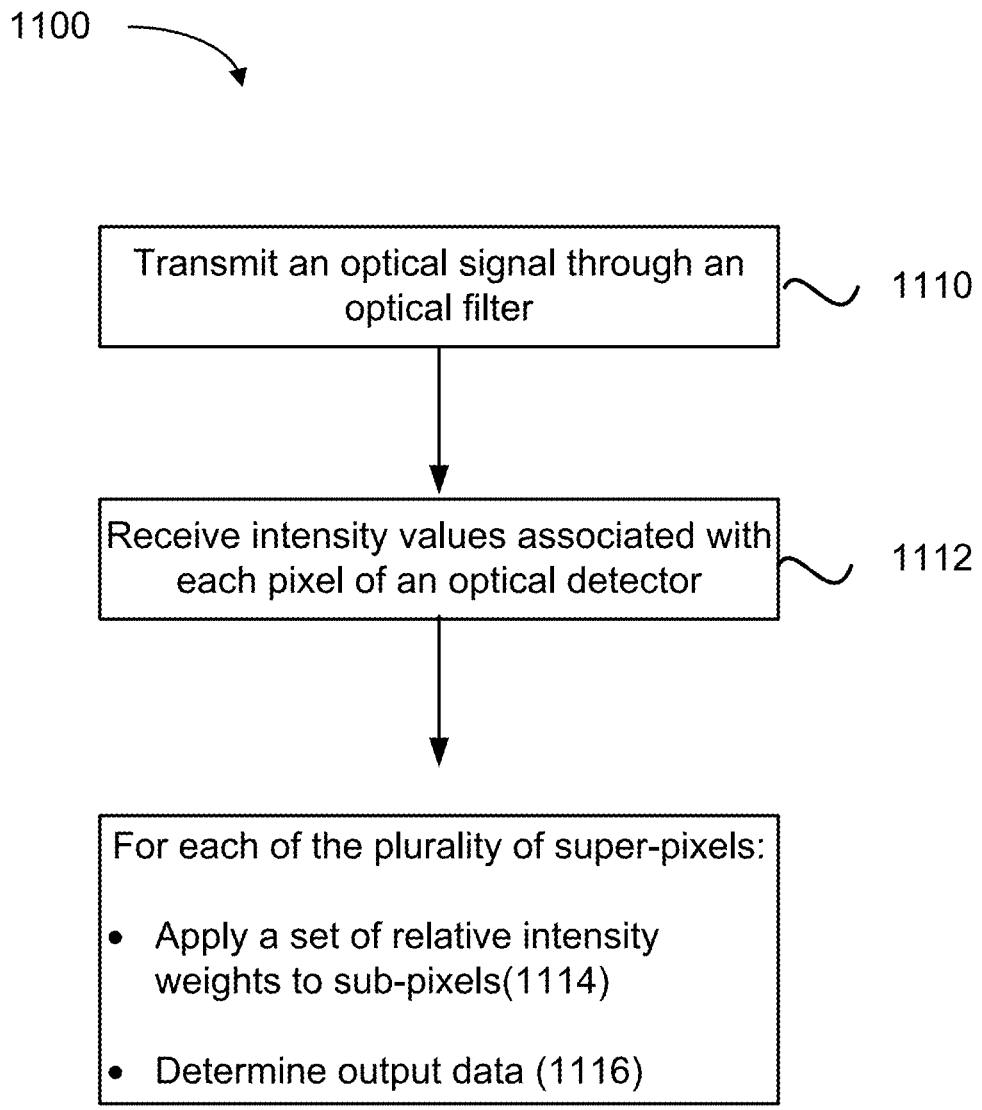
FIG. 11 is a simplified flowchart illustrating a method according to an embodiment of the present invention.

FIG. 11 is a simplified flowchart illustrating a method according to an embodiment of the present invention. The method 1100 includes transmitting an optical signal through an optical filter comprising a plurality of super-pixels (1110). Each of the plurality of super-pixels comprises a plurality of sub-pixels. A predetermined number of the plurality of sub-pixels are characterized by an oscillatory transmission profile as a function of wavelength. One of the plurality of sub-pixels can be characterized by a uniform transmission profile as a function of wavelength, thereby providing situational awareness at the resolution of the super-pixels. This sub-pixel may also provide an offset (i.e., $a_0$) for a Fourier expansion.

The method also includes receiving intensity values associated with each pixel of a detector (1112). Each pixel of the detector, which can be a focal plane array, is associated with one of the plurality of sub-pixels. The method further includes, for each of the plurality of super-pixels, applying a set of relative weights to corresponding intensity values associated with sub-pixels of the plurality of sub-pixels (1114) and determining an output data (1116). The set of relative weights can be retrieved from a look-up table of relative weights using the spectral profile. Alternatively, the set of relative weights can be computed using a Fourier expansion of a spectral profile.

In some embodiments, the method additionally includes modifying the first set of relative weights to produce a second set of relative weights and, for each of the plurality of super-pixels, applying weights of the second set of relative weights to corresponding sub-pixels of the plurality of sub-pixels and determining a second output data. Modifying the first set of relative weights can include accessing a look-up table of weights using the spectral profile. Modifying the first set of relative weights can include determining a first contrast score from the first output data, modifying at least one weight in the first set of relative weights to provide a modified set of relative weights, applying weights of the modified set of relative weights to corresponding sub-pixels of the plurality of sub-pixels, determining a second contrast score from the second output data, and comparing the first contrast score to the second contrast score. The first set of weights associated with the first contrast score can be reapplied to the plurality of sub-pixels if the first contrast score is greater than the second contrast score.

It should be appreciated that the specific steps illustrated in FIG. 11 provide a particular method according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention enable collection of image data using an optical system while reducing data transmission bandwidth. As an example, a spectral profile can be defined, for example, a bandpass filter centered at 9.4 μm with a bandwidth of 0.8 μm. The set of weights associated with each sub-pixel that will produce this spectral profile or an approximation to this spectral profile, can be computed and provided to the optical system, which can be, for example, mounted on a drone. During image acquisition, the intensity values of the pixels of the focal plane array are measured, with each pixel corresponding to one of the sub-pixels. Processing can be performed by a processor of the optical system that applies the appropriate weight to each corresponding sub-pixel as discussed in relation to FIG. 6, producing an image at the super-pixel resolution. In this case, after processing, an image at the super-pixel resolution is produced, for example, a resolution of 1024×1024. Accordingly, embodiments of the present invention can reduce communication bandwidths since the super-pixel resolution can be a fraction (e.g., ⅑) of the focal plane array resolution.

Embodiments of the present invention also include interpretation of the full sub-pixel array resolution with a defined spectral profile. Because super-pixels are spatially periodic on the focal plane array, every sub-pixel is surrounded by the 8 complementary sub-pixels needed to generate a super-pixel value, excepting sub-pixels bordering the focal plane array. Therefore, the focal plane array can generate 3070×3070 resolution imagery with a selected bandpass by treating each sub-pixel as the center of a super-pixel.

In relation to FIG. 1, super-pixel 105 was described as the collection of sub-pixels 110, 120, 130, 140, 150, 160, 170, 180, and 190, a 3×3 sub-pixel array centered on sub-pixel 150. Super-pixel 103 can also be defined as the collection of sub-pixels 182, 192, 173, 120, 130, 111, 150, 160, and 141, a 3×3 sub-pixel array centered on sub-pixel 130. The sub-pixels in super-pixel 103 have the same set of spectral filters used in super-pixel 105. Explicitly, sub-pixel 182 has the same filter as sub-pixel 180, sub-pixel 192 has the same filter as sub-pixel 190, and so on for sub-pixel 173 and sub-pixel 170, sub-pixel 111 and sub-pixel 110, and sub-pixel 141 and sub-pixel 140. Thus, one or more of the predetermined number of sub-pixels of a first super-pixel can also be sub-pixels of a second super-pixel.

The same process described herein to combine sub-pixel intensities to generate a super-pixel with a defined bandpass can be applied to each sub-pixel in spectral basis filter 100. As a result, 3070×3070 resolution imagery with a full spectral bandpass control can be generated from the 3072×3072 resolution pixel array. Because the optics may be designed for a blur circle of order the size of a super-pixel, this mode of operation can generate a spatially oversampled image, which has advantages that will be apparent to one of ordinary skill in the art.

In other embodiments, the intensity values of the pixels of the focal plane array can be transmitted to a separate system for processing. In this case, the resolution of the image data will match the pixel resolution of the focal plane array and the data communication bandwidth will correspond to the focal plane array resolution, for example, a resolution of 3072×3072. By transmitting the image data at the focal plane array resolution and performing post-processing, different sets of weights can be applied to the image data. Merely by way of example, using a first set of weights, the appropriate weight can be applied to each corresponding sub-pixel, producing an image characterized by a first spectral profile, for example, a bandpass filter centered at 9.4 μm with a bandwidth of 0.8 μm. Subsequently, a second set of weights corresponding to a second spectral profile, for example, a bandpass filter centered at 9.45 μm with a bandwidth of 0.8 μm, can be applied to the image data, resulting in an image characterized by the second spectral profile. Using additional sets of weights, the spectral profile can be modified, in this example, by sweeping a bandpass filter across a predetermined wavelength range and producing image data corresponding to each of the various spectral profiles.

Thus, in contrast with conventional imaging systems that use spectral filters with predetermined spectral profiles, embodiments of the present invention enable image data to be collected over a range of wavelengths (e.g., 8 µm to 10.5 µm) and then post-processed to provide a series of images that are each associated with a different spectral profile. In a particular embodiment, the image contrast can be enhanced by selecting an image that has a contrast score higher than other contrast scores associated with other images. If the image data is recorded at the resolution of the focal plane array, post-processing can modify the spectral profiles, thereby applying different spectral profiles to the recorded image data and generating image data associated with the different spectral profiles during post-processing.

It will be appreciated that image processing using the set of weights can be performed by a processor of the optical system. Continuing with the example discussed above, the various sets of weights can be applied to the image data by a processor of the optical system, effectively sweeping the bandpass filter across the wavelength range of interest. Subsequently, one or more of the images produced by the optical system can be transmitted to a separate system, such as a ground station in communication with the optical system, which can, as discussed above, be mounted on a drone. Additionally, in a manner similar to automatic gain control, automatic contrast control can be achieved by performing spectral tailoring of the image data to increase image contrast. As image data is acquired, application of various sets of weights to the image data can be used to measure image contrast in the images, thereby producing images with enhanced contrast and performing automatic contrast control. One of ordinary skill in the art would recognize many variations, modifications, and alternatives.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

While the principles of the disclosure have been described above in connection with specific apparatuses and methods, it is to be clearly understood that this description is made only by way of example and not as limitation on the scope of the disclosure.

It is also understood that the examples and examples described herein are for illustrative purposes only and that various modifications or changes in light thereof will be suggested to persons skilled in the art and are to be included within the spirit and purview of this application and scope of the appended claims.

What is claimed is:

1. An optical system comprising:
   a focal plane array having a plurality of pixels defined by a first number of pixels arrayed in a first direction and a second number of pixels arrayed in a second direction; and
   an optical filter optically coupled to the focal plane array, wherein the optical filter has a plurality of super-pixels, wherein each of the plurality of super-pixels includes a predetermined number of sub-pixels, each of the predetermined number of sub-pixels being characterized by one of a plurality of oscillatory optical transmission profiles varying in amplitude between zero and one as a function of wavelength.

2. The optical system of claim 1, wherein one or more of the predetermined number of sub-pixels of a first super-pixel are also sub-pixels of a second super-pixel.

3. The optical system of claim 1 wherein the predetermined number of sub-pixels is defined by a first number of sub-pixels arrayed in the first direction and a second number of sub-pixels arrayed in the second direction.

4. The optical system of claim 1 wherein each of the plurality of the oscillatory optical transmission profiles is distinct from others of the plurality of the oscillatory optical transmission profiles.

5. The optical system of claim 4 wherein each of the plurality of the oscillatory optical transmission profiles is characterized by a different combination of oscillation frequency and phase.

6. The optical system of claim 1 wherein each of the predetermined number of sub-pixels comprises one or more layers of a film that is substantially transparent in the infrared.

7. The optical system of claim 6 wherein the one or more layers of the film comprises a single thin film layer and each of the predetermined number of sub-pixels is characterized by a different thickness of the single thin film layer.

8. The optical system of claim 1 further comprising a computation module configured to apply a predetermined weight to each of the predetermined number of sub-pixels.

9. A method for defining a spectral profile for an optical filter, the method comprising:
   determining one or more characteristics of the spectral profile;
   defining a transmission profile for each of a plurality of sub-pixels, wherein a predetermined number of the plurality of sub-pixels are characterized by an oscillatory optical transmission profile varying in amplitude between zero and one as a function of wavelength; and
   associating a weight of a set of relative weights with each of the plurality of sub-pixels.

10. The method of claim 9, further comprising determining the set of relative weights by accessing a look-up table of weights using the one or more characteristics of the spectral profile.

11. The method of claim 9, further comprising:
    determining a first contrast score using an output of the optical filter;
    modifying at least one weight in the set of relative weights to define a modified set of relative weights;
    associating the modified set of relative weights with each of the plurality of sub-pixels;
    determining a second contrast score using the output of the optical filter with the modified set of relative weights; and
    selecting the set of relative weights to use based on a comparison between the second contrast score and the first contrast score.

12. The method of claim 9, wherein the one or more characteristics of the spectral profile comprise at least one of a bandpass short edge, a bandpass long edge, a spectral range cut-on, or a spectral range cut-off.

13. The method of claim 9, wherein defining the transmission profile for each of the plurality of sub-pixels comprises determining a thickness of a thin film associated with each of the plurality of sub-pixels, wherein the thin film is substantially transparent in the infrared.

14. A method comprising:
transmitting an optical signal through an optical filter comprising a plurality of super-pixels, wherein each of the plurality of super-pixels comprises a plurality of sub-pixels, wherein a predetermined number of the plurality of sub-pixels are characterized by an oscillatory optical transmission profile varying in amplitude between zero and one as a function of wavelength; and
receiving intensity values associated with each pixel of a detector, wherein each pixel of the detector is associated with one of the plurality of sub-pixels; and
for each of the plurality of super-pixels:
applying a set of relative weights to corresponding intensity values associated with sub-pixels of the plurality of super-pixels; and
determining an output data.

15. The method of claim 14, wherein one of the plurality of sub-pixels is characterized by a uniform optical transmission profile as a function of wavelength.

16. The method of claim 14, further comprising retrieving the set of relative weights from a look-up table of relative weights corresponding to a spectral profile.

17. The method of claim 14, further comprising computing the set of relative weights using a Fourier expansion of a spectral profile.

18. The method of claim 14, further comprising:
modifying the set of relative weights; and
for each of the plurality of super-pixels;
applying the modified set of relative weights to corresponding sub-pixels of the plurality of sub-pixels; and
determining a modified output data.

19. The method of claim 18, wherein modifying the set of relative weights comprises accessing a look-up table of weights corresponding to a modified spectral profile.

20. The method of claim 18, wherein modifying the set of relative weights comprises:
determining a first contrast score corresponding to the output data;
determining a second contrast score corresponding to the modified output data;
determining that the first contrast score is greater than the second contrast score; and
reapplying the set of relative weights to the corresponding intensity values associated with the sub-pixels of the plurality of sub-pixels.

* * * * *